US011424076B2

(12) United States Patent
Yamato et al.

(10) Patent No.: US 11,424,076 B2
(45) Date of Patent: Aug. 23, 2022

(54) MULTI-LAYER CERAMIC CAPACITOR

(71) Applicant: Taiyo Yuden Co., Ltd., Tokyo (JP)

(72) Inventors: Yuto Yamato, Tokyo (JP); Takayuki Hattori, Tokyo (JP); Takashi Asai, Tokyo (JP); Hisamitsu Shizuno, Tokyo (JP); Keisuke Ishii, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 17/182,761

(22) Filed: Feb. 23, 2021

(65) Prior Publication Data

US 2021/0183583 A1    Jun. 17, 2021

Related U.S. Application Data

(63) Continuation of application No. 16/220,861, filed on Dec. 14, 2018, now Pat. No. 10,964,482.

(30) Foreign Application Priority Data

Dec. 15, 2017 (JP) .............................. JP2017-240796

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/005* (2013.01); *H01G 4/012* (2013.01); *H01G 4/12* (2013.01)

(58) Field of Classification Search
CPC ........ H01G 4/12; H01G 4/012; H01G 4/1227; H01G 4/33; H01G 4/248; H01G 4/224;
(Continued)

(56) References Cited

U.S. PATENT DOCUMENTS 5,603,147 A    2/1997    Bischoff et al.
2011/0273815 A1    11/2011    Kobayashi
(Continued)

FOREIGN PATENT DOCUMENTS

CN    102683018 A    9/2012
CN    104319096 A    1/2015
(Continued)

OTHER PUBLICATIONS

Office Action dated Nov. 15, 2021 in Chinese Application No. 201811534189.7.
(Continued)

*Primary Examiner* — Michael P McFadden
(74) *Attorney, Agent, or Firm* — Saliwanchik, Lloyd & Eisenschenk (57) ABSTRACT

A multi-layer ceramic capacitor having a weight of 8 mg or more includes a capacitance forming unit and a protective unit. The capacitance forming unit includes internal electrodes that are laminated in a first direction and includes end portions, positions of the end portions in a second direction orthogonal to the first direction being aligned with one another within a range of 0.5 μm in the second direction. The protective unit covers the capacitance forming unit in the first direction and the second direction and includes an outer surface, a shortest distance between the outer surface and the end portion of an outermost layer in the internal electrodes in the first direction exceeding 10 μm.

9 Claims, 8 Drawing Sheets

(51) Int. Cl.
*H01G 4/12* (2006.01)
*H01G 4/012* (2006.01)

(58) Field of Classification Search
CPC .......... H01G 4/2325; H01G 4/30; H01G 4/14; H01G 4/008; H01G 4/1236; H01G 4/1245
See application file for complete search history.

(56) References Cited

U.S. PATENT DOCUMENTS

| | | |
|---|---|---|
| 2012/0033828 A1 | 2/2012 | Sugiyama et al. |
| 2012/0229949 A1 | 9/2012 | Kim |
| 2012/0229951 A1 | 9/2012 | Kim |
| 2012/0229952 A1 | 9/2012 | Kim |
| 2014/0189990 A1 | 7/2014 | Kim |
| 2014/0301015 A1* | 10/2014 | Kim ..................... H01G 4/30 29/25.03 |
| 2015/0054388 A1 | 2/2015 | Itagaki et al. |
| 2015/0348712 A1* | 12/2015 | Lee ..................... H01G 4/30 156/89.12 |
| 2016/0196918 A1* | 7/2016 | Hong ..................... H01G 4/232 361/301.4 |
| 2017/0018363 A1 | 1/2017 | Tanaka et al. |
| 2017/0076868 A1 | 3/2017 | Noda et al. |
| 2017/0162322 A1 | 6/2017 | Park et al. |
| 2017/0213645 A1 | 7/2017 | Kim |
| 2017/0287643 A1 | 10/2017 | Kobayashi et al. |
| 2017/0365408 A1 | 12/2017 | Morita et al. |
| 2018/0012702 A1 | 1/2018 | Azuma et al. |
| 2018/0166217 A1* | 6/2018 | Kato ..................... H01G 4/012 |

FOREIGN PATENT DOCUMENTS

| | | |
|---|---|---|
| CN | 106910627 A | 6/2017 |
| CN | 106910629 A | 6/2017 |
| CN | 107210131 A | 9/2017 |
| JP | 11-340083 A | 12/1999 |
| JP | 2001-006964 A | 1/2001 |
| JP | 2011-238724 A | 11/2011 |
| JP | 2012-191159 A | 10/2012 |
| JP | 2017-59815 A | 3/2017 |
| JP | 2017-183469 A | 10/2017 |

OTHER PUBLICATIONS

Office Action dated Jun. 2, 2021 in Chinese Application No. 201811534189.7, along with its English translation.
Office Action dated Jan. 30, 2020 in U.S. Appl. No. 16/220,861.
Office Action dated Jul. 13, 2020 in U.S. Appl. No. 16/220,861.
Office Action dated Nov. 3, 2020 in U.S. Appl. No. 16/220,861.
Notice of Allowance dated Jan. 27, 2021 in U.S. Appl. No. 16/220,861.
Office Action dated Mar. 22, 2022 in Japanese Application No. 2017-240796.

* cited by examiner

MULTI-LAYER CERAMIC CAPACITOR

CROSS-REFERENCE TO RELATED APPLICATIONS

This application is a continuation of U.S. application Ser. No. 16/220,861, filed Dec. 14, 2018; which claims the benefit under 35 U.S.C. § 119 of Japanese Application No. 2017-240796, filed Dec. 15, 2017, which are hereby incorporated in their entirety.

BACKGROUND

The present disclosure relates to a large-size multi-layer ceramic capacitor.

Japanese Patent Application Laid-open No. 2001-6964 discloses a large-size multi-layer ceramic capacitor. Such a large-size multi-layer ceramic capacitor enables increase in capacitance by enlarging the intersectional area of internal electrodes or increasing the number of lamination. This allows the multi-layer ceramic capacitor to be used in place of an electrolytic capacitor, for example.

SUMMARY

However, the weight of the multi-layer ceramic capacitor increases along with increase in size thereof. Accordingly, a large impact is given to the large-size multi-layer ceramic capacitor by the self-weight even when the large-size multi-layer ceramic capacitor drops from the height of approximately several centimeters at the time of manufacturing, mounting, or the like. Therefore, the large-size multi-layer ceramic capacitor is likely to crack.

In the multi-layer ceramic capacitor having cracks, when moisture that has infiltrated into the cracks from an external environment reaches the internal electrodes, sufficient insulation properties between the internal electrodes may be difficult to ensure. Therefore, the multi-layer ceramic capacitor has difficulty in ensuring the moisture resistance along with the increase in size.

In view of the circumstances as described above, it is desirable to provide a multi-layer ceramic capacitor having both of high moisture resistance and a large capacitance.

According to an embodiment of the present disclosure, there is provided a multi-layer ceramic capacitor having a weight of 8 mg or more and including a capacitance forming unit and a protective unit.

The capacitance forming unit includes internal electrodes that are laminated in a first direction and includes end portions, positions of the end portions in a second direction orthogonal to the first direction being aligned with one another within a range of 0.5 µm in the second direction.

The protective unit covers the capacitance forming unit in the first direction and the second direction and includes an outer surface, a shortest distance between the outer surface and the end portion of an outermost layer in the internal electrodes in the first direction exceeding 10 µm.

In this configuration, since the positions of the end portions of the internal electrodes are aligned with one another, the internal electrodes can be appropriately protected also by the protective unit having a small thickness. Therefore, in this configuration, it is possible to reduce the thickness of the protective unit and enlarge the intersectional area of the internal electrodes as much. With this configuration, increase in capacitance can be achieved without involving increase in size. In such a manner, this configuration does not cause the increase in weight by the increase in capacitance. Thus, cracks are less likely to be generated.

Further, in this configuration, the shortest distance between the outer surface of the protective unit and the end portion of the outermost layer in the internal electrodes exceeds 10 µm. In other words, in the protective unit, the thickness is sufficiently ensured at the ridge that covers the vicinity of the end portion of the outermost layer in the internal electrodes. Accordingly, even if a crack is generated in the ridge of the protective unit due to an impact at dropping, moisture that has infiltrated into the crack is less likely to reach the internal electrodes.

In such a manner, in this multi-layer ceramic capacitor, cracks are less likely to be generated and moisture resistance is less likely to be impaired even if cracks are generated.

The outer surface of the protective unit may have an exposure dimension of 1 mm or more in a third direction orthogonal to the first direction and the second direction.

In this configuration, the exposure dimension of the outer surface of the protective unit is large and an impact is easily applied to the protective unit, but moisture resistance is less likely to be impaired by the configuration described above.

The number of lamination of the internal electrodes may be 500 layers or more.

In this configuration, the multi-layer ceramic capacitor having a large capacitance is further obtained.

It is possible to provide a multi-layer ceramic capacitor having both of high moisture resistance and a large capacitance.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the figures.

In the figures, an X axis, a Y axis, and a Z axis orthogonal to one another are shown as appropriate. The X axis, the Y axis, and the Z axis are common in all figures.

1. OVERALL CONFIGURATION OF MULTI-LAYER CERAMIC CAPACITOR 10

Figure 1:
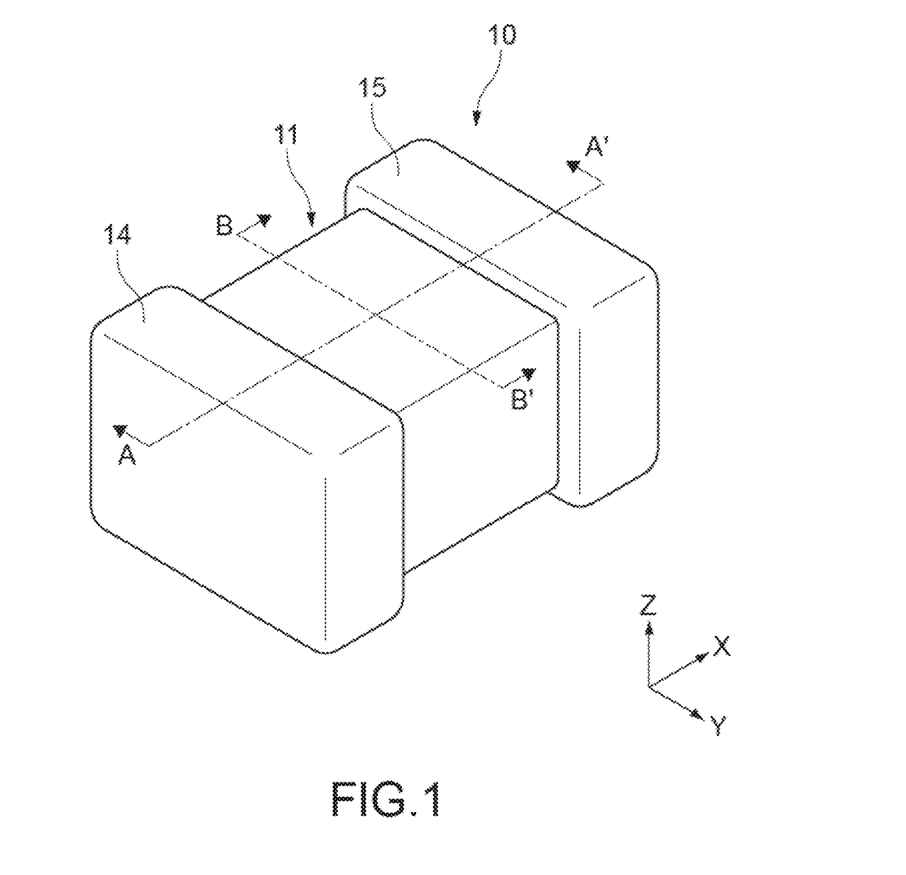
FIG. 1 is a perspective view of a multi-layer ceramic capacitor according to an embodiment of the present disclosure.
Figure 2:
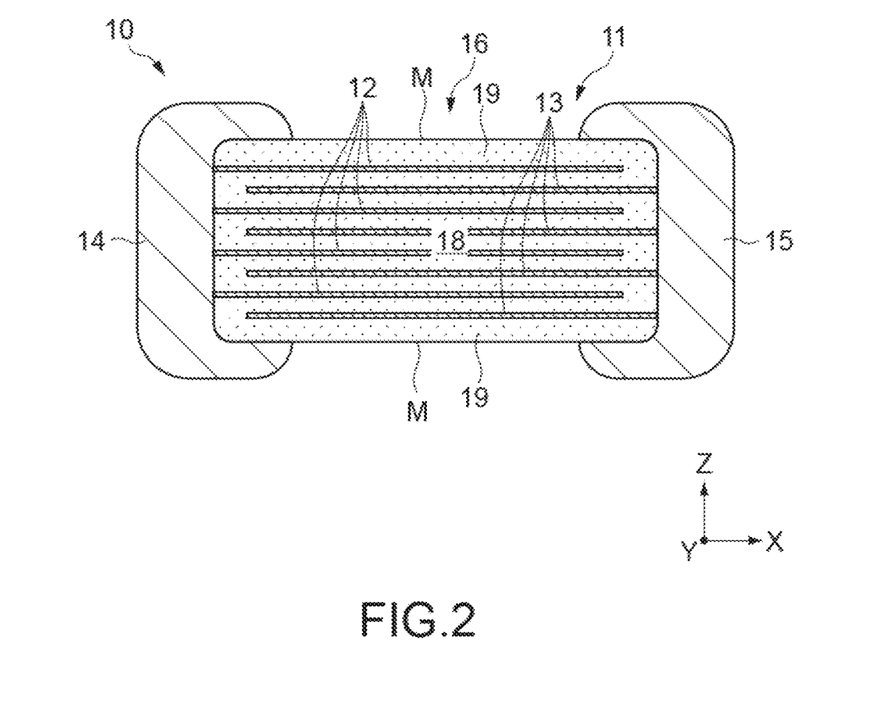
FIG. 2 is a cross-sectional view of the multi-layer ceramic capacitor taken along the A-A' line in FIG. 1.
Figure 3:
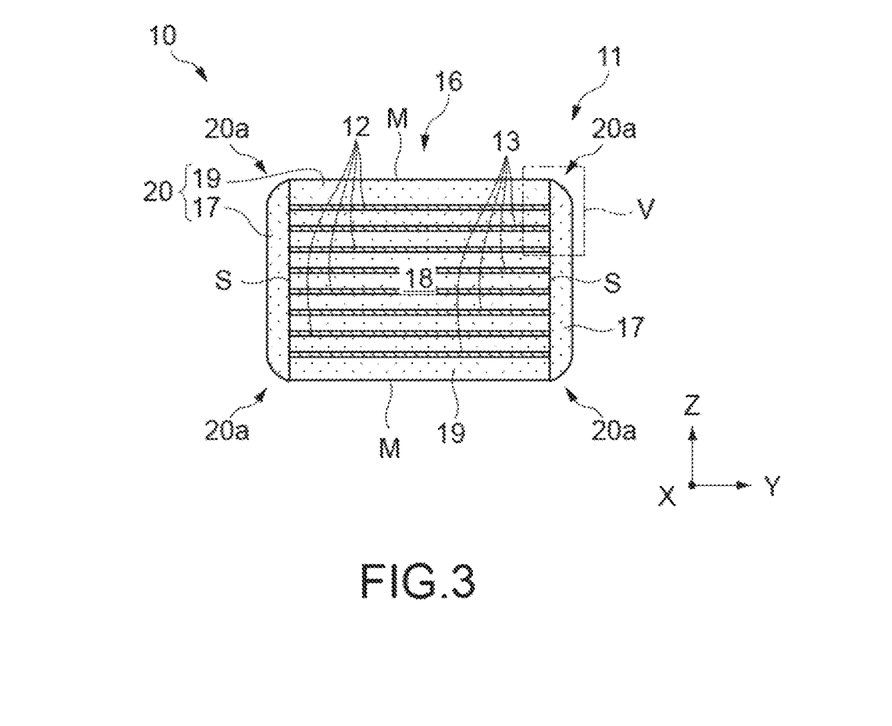
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 has a configuration of a large capacitance and a large size with the weight of 8 mg or more. Typically, the multi-layer ceramic capacitor 10 has a dimension of approximately 1.6 to 5.7 mm in the X-axis direction and dimensions of approximately 0.8 to 5.0 mm in the Y- and Z-axis directions. Further, typically, the capacitance of the multi-layer ceramic capacitor 10 is approximately 100 to 1,000 μF.

The multi-layer ceramic capacitor 10 can be widely used in use applications expected for a large capacitance and is typically used in a use application in which an electrolytic capacitor is used. As an example, the multi-layer ceramic capacitor 10 can be used in place of an electrolytic capacitor that is widely used in stationary devices for mobile communications.

The multi-layer ceramic capacitor 10 includes a ceramic body 11, a first external electrode 14, and a second external electrode 15. Typically, the ceramic body 11 is formed as a hexahedron having two main surfaces facing in the Z-axis direction, two side surfaces facing in the Y-axis direction, and two end surfaces facing in the X-axis direction.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 may not extend to any of the main surfaces and the side surfaces.

The first and second external electrodes 14 and 15 are each formed of a good conductor of electricity. Examples of the good conductor of electricity forming the first and second external electrodes 14 and 15 include a metal or alloy mainly containing copper (Cu), nickel (Ni), tin (Sn), palladium (Pd), platinum (Pt), silver (Ag), gold (Au), or the like.

The ceramic body 11 is formed of dielectric ceramics and includes a multi-layer unit 16 and side margins 17. The multi-layer unit 16 has two main surfaces M facing in the Z-axis direction and two side surfaces S facing in the Y-axis direction. The side margins 17 cover the two side surfaces S of the multi-layer unit 16.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 vertically in the Z-axis direction and constitute the two main surfaces M of the multi-layer unit 16.

The capacitance forming unit 18 includes a plurality of first internal electrodes 12 and a plurality of second internal electrodes 13 that are disposed between the plurality of ceramic layers. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first and second internal electrodes 12 and 13 are formed over the entire width of the capacitance forming unit 18 in the Y-axis direction and are exposed at both the side surfaces S of the multi-layer unit 16. In the ceramic body 11, the side margins 17 that cover both the side surfaces S of the multi-layer unit 16 ensure insulation properties between the first internal electrodes 12 and the second internal electrodes 13, which are adjacent to each other in both the side surfaces S of the multi-layer unit 16.

The covers 19 and the side margins 17 cover the capacitance forming unit 18 in the Y- and Z-axis directions to be configured as a protective unit 20 that protects the capacitance forming unit 18. The protective unit 20 has a function of protecting the capacitance forming unit 18 from an impact given to the ceramic body 11 when the multi-layer ceramic capacitor 10 drops at the time of manufacturing or mounting, for example.

Since the multi-layer ceramic capacitor 10 has a configuration of a large size with the weight of 8 mg or more, a large impact is given thereto by the self-weight when the multi-layer ceramic capacitor 10 drops. As a result, in the multi-layer ceramic capacitor 10, a crack easily occurs in the protective unit 20. When the crack reaches the first internal electrodes 12 and the second internal electrodes 13, insulation properties between the first internal electrodes 12 and the second internal electrodes 13 are reduced due to moisture of the external environment.

It is known that a crack is easily generated particularly when the impact energy of $3.0*10^{-6}$ J or more is applied to the multi-layer ceramic capacitor 10. This impact energy corresponds to the energy when a multi-layer ceramic capacitor 10 of 10 mg drops from the height of 3 cm and collides with another multi-layer ceramic capacitor 10.

Further, in the multi-layer ceramic capacitor 10, as a dimension of the outer surface of the protective unit 20 in the X-axis direction, which is exposed without being covered with the first and second external electrodes 14 and 15, i.e., an exposure dimension becomes larger, an impact is more likely to be given to the protective unit 20. Specifically, when the exposure dimension of the outer surface of the protective unit 20 is 1 mm or more, or further 2.5 mm or more, a crack is easily generated particularly in the protective unit 20.

The protective unit 20 of the multi-layer ceramic capacitor 10 according to this embodiment has a configuration in which moisture resistance is less likely to be impaired even if a crack is generated when the multi-layer ceramic capacitor 10 drops at the time of manufacturing, mounting, or the like. The configuration in which moisture resistance of the protective unit 20 is less likely to be impaired will be described later in detail in the "Detailed Configuration of Protective Unit 20".

The first internal electrodes 12 are drawn to one of the end portions of the ceramic body 11. The second internal electrodes 13 are drawn to the other end portion of the ceramic body 11. With this configuration, the first internal electrodes 12 are connected to only the first external electrode 14, and the second internal electrodes 13 are connected to only the second external electrode 15.

With such a configuration, when a voltage is applied between the first external electrode 14 and the second external electrode 15 in the multi-layer ceramic capacitor 10, the voltage is applied to the plurality of ceramic layers between the first internal electrodes 12 and the second internal electrodes 13. With this configuration, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may be formed of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that FIGS. 2 and 3 each show eight layers of the first and second internal electrodes 12 and 13 in total, which is much smaller than the actual number of laminated layers, for the purpose of facilitating visualization of the laminated structure. However, in the multi-layer ceramic capacitor 10, it is favorable that the total number of first and second internal electrodes 12 and 13 to be laminated is 500 layers or more in order to obtain a large capacitance as described above.

Further, the basic configuration of the multi-layer ceramic capacitor 10 according to this embodiment is not limited to the configuration shown in FIGS. 1 to 3 and can be changed as appropriate. For example, the shapes of the ceramic body 11 and the first and second external electrodes 14 and 15 can be determined as appropriate according to the size and performance expected for the multi-layer ceramic capacitor 10.

2. METHOD OF PRODUCING MULTI-LAYER CERAMIC CAPACITOR 10

Figure 4:
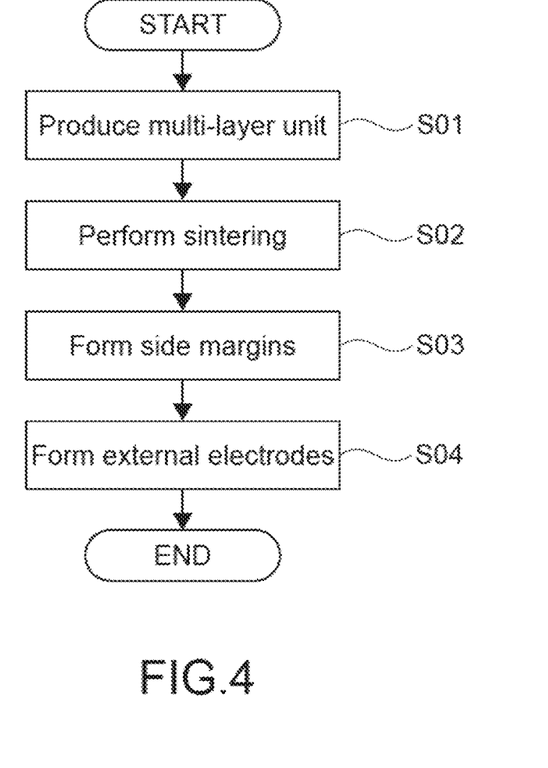
FIG. 4 is a flowchart showing a method of producing the multi-layer ceramic capacitor.
Figure 5:
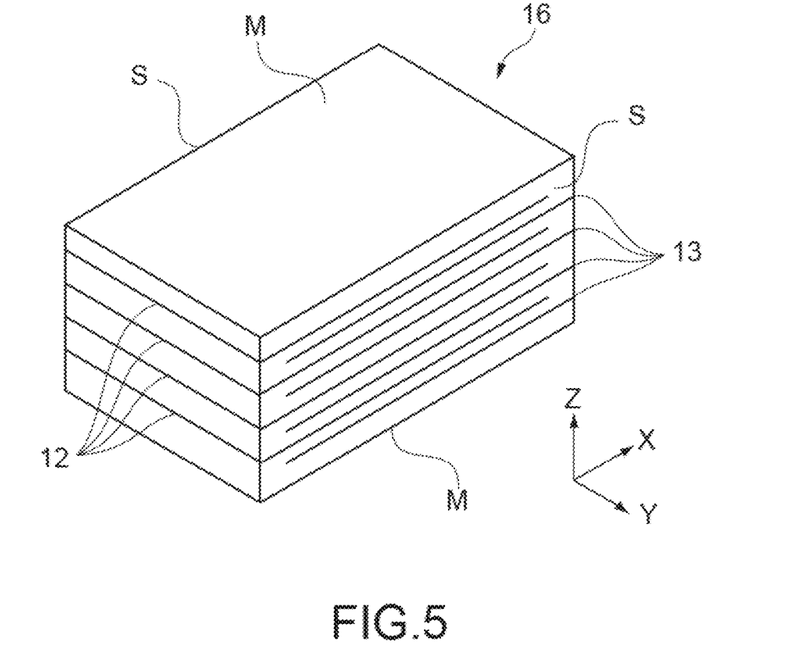
FIG. 5 is a perspective view of a multi-layer unit produced in Step S01 of the production method described above.
Figure 6A:
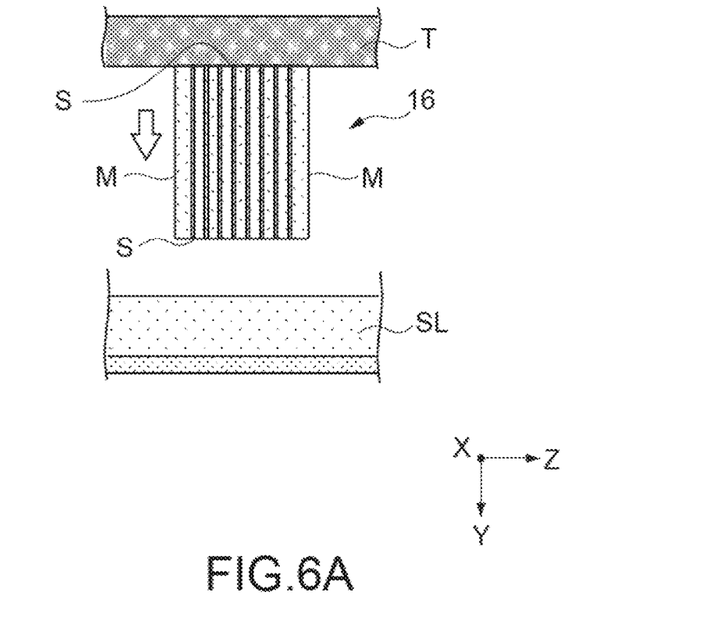
FIG. 6A is a cross-sectional view schematically showing Step S03 of the production method described above.
Figure 6B:
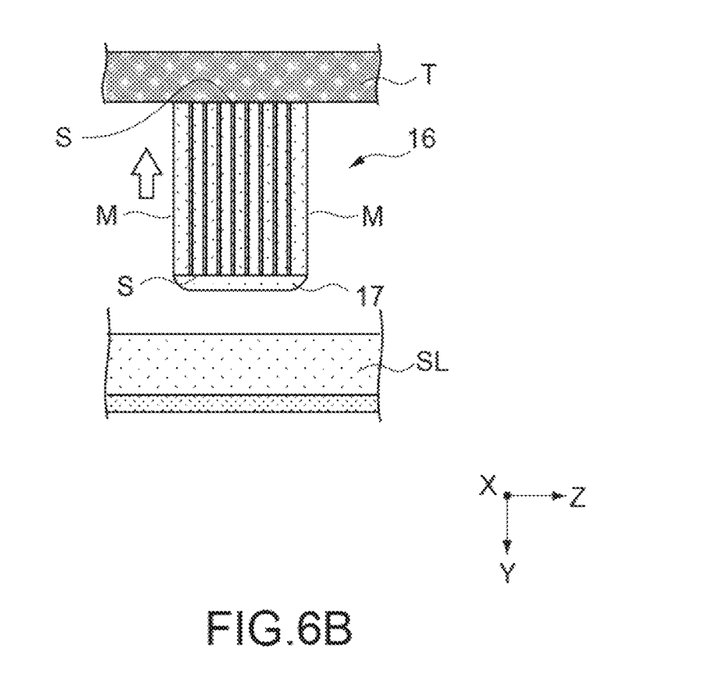
FIG. 6B is a cross-sectional view schematically showing Step S03 of the production method described above.

FIG. 4 is a flowchart showing a method of producing the multi-layer ceramic capacitor 10. FIGS. 5, 6A, and 6B are views each schematically showing a production process of the multi-layer ceramic capacitor 10. Hereinafter, the method of producing the multi-layer ceramic capacitor 10 will be described according to FIG. 4 with reference to FIGS. 5, 6A, and 6B as appropriate.

2.1 Step S01: Production of Multi-Layer Unit

In Step S01, an unsintered multi-layer unit 16 is produced. Specifically, first, a plurality of unsintered dielectric green sheets on which the first and second internal electrodes 12 and 13 are printed with predetermined patterns as appropriate are laminated. Subsequently, the laminated dielectric green sheets are cut in the X- and Y-axis directions for singulation, so that an unsintered multi-layer unit 16 is obtained.

FIG. 5 is a perspective view of the unsintered multi-layer unit 16 obtained in Step S01. In the multi-layer unit 16, the surfaces S are formed as cut surfaces, and both the first internal electrodes 12 and the second internal electrodes 13 are exposed at the surfaces S. In other words, in the multi-layer unit 16 obtained in Step S01, the positions of the end portions of the first and second internal electrodes 12 and 13 in the Y-axis direction are aligned with one another in the surfaces S.

2.2 Step S02: Sintering

In Step S02, the unsintered multi-layer unit 16 obtained in Step S01 is sintered. A sintering temperature for the multi-layer unit 16 can be set to approximately 1,000 to 1,300° C., for example, when a barium titanate ($BaTiO_3$) based material is used. Further, sintering can be performed in a reduction atmosphere or a low-oxygen partial pressure atmosphere, for example.

In such a manner, in this embodiment, the multi-layer unit 16 is sintered before the side margins 17 are formed in Step S03 to be described later. This can remove a solvent or a binder contained in the unsintered multi-layer unit 16 more reliably. Therefore, in this embodiment, it is possible to produce a multi-layer ceramic capacitor 10 with a stable quality.

2.3 Step S03: Formation of Side Margins

In Step S03, the side margins 17 are provided to the side surfaces S of the multi-layer unit 16 sintered in Step S02, to produce a ceramic body 11. Specifically, in Step S03, the unsintered side margins 17 are provided to the side surfaces S of the multi-layer unit 16 by dipping and then baked onto the surfaces S of the multi-layer unit 16.

More specifically, first, as shown in FIG. 6A, ceramic slurry SL housed in a container is prepared, and one side surface S of the multi-layer unit 16, the other side surface S of which is held with a tape T, is caused to face the ceramic slurry SL. The thickness of the side margin 17 is adjustable by the contained amount of a solvent or a binder in the ceramic slurry SL.

Next, the multi-layer unit 16 shown in FIG. 6A is moved downward and then the side surface S of the multi-layer unit 16 is immersed into the ceramic slurry SL. Subsequently, as shown in FIG. 6B, the multi-layer unit 16 is pulled up in a state where the ceramic slurry SL is adhering to the surface S. Thus, the unsintered side margin 17 is formed on the surface S of the multi-layer unit 16.

Subsequently, the orientation of the side surface S of the multi-layer unit 16 in the Y-axis direction is inverted by transferring the multi-layer unit 16 to a tape different from the tape T shown in FIG. 6B. In the manner similar to the above, the unsintered side margin 17 is formed also on the side surface S on the other side of the multi-layer unit 16, on which the side margin 17 is not formed.

The multi-layer unit 16 having the surfaces S on which the unsintered side margins 17 are formed is then re-sintered. Thus, the side margins 17 are sintered and are simultaneously baked onto the surfaces S of the multi-layer unit 16. Thus, the ceramic body 11 of the multi-layer ceramic capacitor 10 is obtained.

When the side margins 17 are baked, stress corresponding to a shrinkage behavior of the side margins 17 is applied between the multi-layer unit 16 and the side margins 17. This stress is likely to increase particularly in a large-size multi-layer ceramic capacitor 10. This stress may cause the side margins 17 to be peeled off from the surfaces S of the multi-layer unit 16.

In this regard, the side margins 17 according to this embodiment are formed by dipping into the ceramic slurry SL, and thus the side margins 17 has flexibility in the unsintered stage. Accordingly, the stress to be applied between the multi-layer unit 16 and the side margins 17 due to the shrinkage of the side margins 17 at the time of baking is suppressed. Thus, the peel-off of the side margins 17 is less likely to occur.

It should be noted that a method of providing the unsintered side margins 17 to the surfaces S of the multi-layer unit 16 is not limited to the dipping. For example, a ceramic sheet may be used instead of the ceramic slurry SL. In this case, the side margin 17 may be formed on the surface S of the multi-layer unit 16 by punching the ceramic sheet by the surface S of the multi-layer unit 16.

Alternatively, the unsintered side margins 17 may be provided to the surfaces S of the unsintered multi-layer unit 16 before Step S02 as needed, to form the unsintered ceramic body 11. With this configuration, in Step S02, the multi-layer unit 16 and the side margins 17 that form the ceramic body 11 can be simultaneously sintered.

2.4 Step S04: Formation of External Electrodes

In Step S04, the first external electrode 14 and the second external electrode 15 are formed on both the end portions of the ceramic body 11 in the X-axis direction obtained in Step S03, to produce the multi-layer ceramic capacitor 10 shown in FIGS. 1 to 3. A method of forming the first external electrode 14 and the second external electrode 15 in Step S04 is optionally selectable from publicly known methods.

3. DETAILED CONFIGURATION OF PROTECTIVE UNIT 20

3.1 Thickness of Side Margin 17

In the methods in the related art in which the side margins are not subsequently provided, internal electrode patterns are printed on the unsintered dielectric green sheets to form the side margins. In other words, the internal electrodes are disposed to be spaced from the cut surface, which is obtained at the time of singulation, with a gap corresponding to each side margin. Therefore, a ceramic body including the side margins is obtained at the time of singulation.

In the above-mentioned methods in the related art, there is a limitation on the position accuracy of the printing and lamination of the internal electrodes, and thus the internal electrodes are misaligned with one another. As a result, the thickness of the side margin is likely to be deviated from a design value. For that reason, in order to appropriately protect the internal electrodes, the thickness of the side margin is inevitably designed to be large in consideration of the misalignment of the internal electrodes.

To the contrary, as described above, in the method of producing the multi-layer ceramic capacitor 10 according to this embodiment, the positions of the end portions of the first and second internal electrodes 12 and 13 in the Y-axis direction are aligned with one another in the surfaces S of the multi-layer unit 16. Specifically, the positions of the end portions of the first and second internal electrodes 12 and 13 in the Y-axis direction are aligned with one another in the range of 0.5 µm in the Y-axis direction.

In this embodiment, the side margins 17 are provided in a subsequent step on the side surfaces S of the multi-layer unit 16 in which the end portions of the first and second internal electrodes 12 and 13 in the Y-axis direction are aligned with one another as described above. With this configuration, in the multi-layer ceramic capacitor 10 according to this embodiment, the thickness of the side margin 17 is less likely to be deviated from the design value.

Accordingly, in the multi-layer ceramic capacitor 10, the thickness of the side margin 17 can be determined without considering such design errors that may occur in the production methods in the related art. Therefore, in the multi-layer ceramic capacitor 10, the side margin 17 can be set to have the minimum thickness in a range where the first internal electrodes 12 and the second internal electrodes 13 can be appropriately protected.

Therefore, in the multi-layer ceramic capacitor 10, the thickness of the side margin 17 can be reduced to enlarge the dimensions of the first internal electrodes 12 and the second internal electrodes 13 in the Y-axis direction as much. With this configuration, in the multi-layer ceramic capacitor 10, the intersectional area of the first internal electrodes 12 and the second internal electrodes 13 can be enlarged without involving increase in size.

In such a manner, even if the multi-layer ceramic capacitor 10 achieves the increase in capacitance, the weight is not increased, that is, an impact to be given by the self-weight when the multi-layer ceramic capacitor 10 drops is not increased. Thus, a crack is less likely to be generated. Therefore, in the multi-layer ceramic capacitor 10 according to this embodiment, both of high moisture resistance and a large capacitance can be obtained.

In the multi-layer ceramic capacitor 10, it is favorable to suppress the maximum thickness of the side margin 17 to be 50 µm or less from the viewpoint of the increase in capacitance. Further, in the multi-layer ceramic capacitor 10, it is favorable to ensure 30 µm or more for the maximum thickness of the side margin 17 from the viewpoint of the performance for protecting the first and second internal electrodes 12 and 13.

3.2 Ridge 20a of Protective Unit 20

As shown in FIG. 3, four ridges 20a extending in the X-axis direction are formed in the protective unit 20 of the multi-layer ceramic capacitor 10. Each of the ridges 20a of the protective unit 20 protrudes outward, and is thus likely to receive an external impact. From the viewpoint of mitigating the external impact, the ridges 20a of the protective unit 20 are favorably rounded by chamfering or the like.

Figure 7:
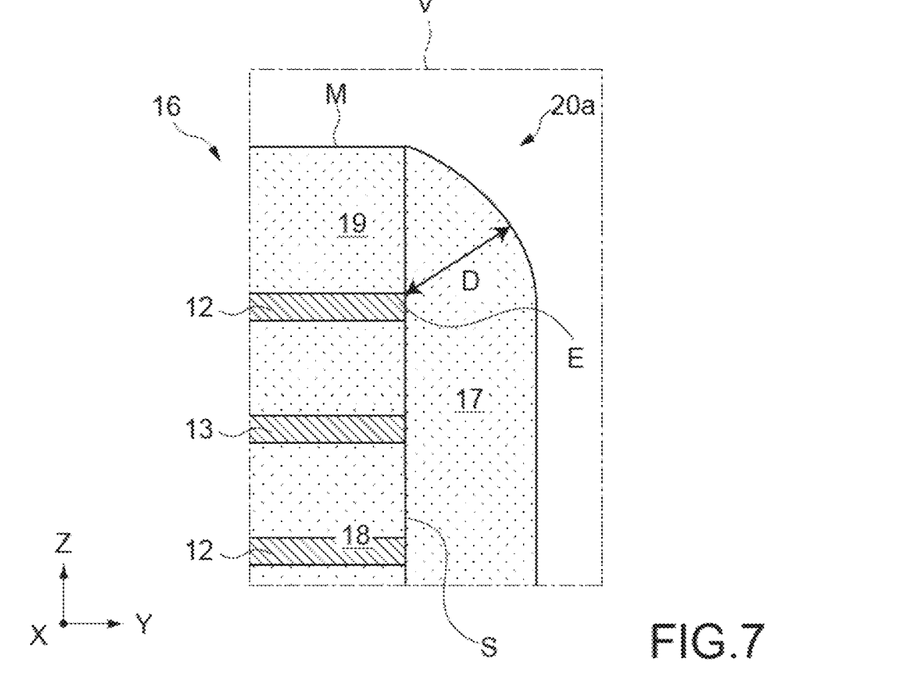
FIG. 7 is a partially enlarged cross-sectional view of a region V of the multi-layer ceramic capacitor shown in FIG. 3.

FIG. 7 is a partially enlarged cross-sectional view of a region V of the multi-layer ceramic capacitor 10, which is surrounded by a chain line of FIG. 3. In other words, FIG. 7 shows the vicinity of the ridge 20a of the protective unit 20. It should be noted that FIG. 7 shows one of the four ridges 20a, but all of the four ridges 20a have the similar configuration.

FIG. 7 shows a shortest distance D from an end portion E of the outermost layer in the Y-axis direction, the outermost layer being located outermost in the first and second internal electrodes 12 and 13 in the Z-axis direction, to the outer surface of the protective unit 20 including the cover 19 and the side margin 17. In other words, the shortest distance D represents the smallest thickness of the protective unit 20 in the vicinity of the end portion E of the outermost layer in the first and second internal electrodes 12 and 13, the end portion E being adjacent to the ridge 20a of the protective unit 20.

In the multi-layer ceramic capacitor 10, the thickness of the protective unit 20 is ensured to be larger than the length of the shortest distance D in the vicinity of the end portion E of the outermost layer in the first and second internal electrodes 12 and 13. In this embodiment, the shortest distance D is larger than 10 µm. With this configuration, even if a crack is generated in the ridge 20a of the protective unit 20, the crack is less likely to reach the end portion E of the outermost layer in the first and second internal electrodes 12 and 13.

Accordingly, in the multi-layer ceramic capacitor 10, moisture that has infiltrated into the crack generated in the ridge 20a of the protective unit 20 is less likely to reach the first and second internal electrodes 12 and 13. Therefore, in the multi-layer ceramic capacitor 10, the insulation properties between the first internal electrodes 12 and the second internal electrodes 13 are less likely to be impaired by the moisture, and thus high moisture resistance is obtained.

The effect of high moisture resistance by the protective unit 20 is obtained effectively in the multi-layer ceramic capacitor 10 with the weight of 8 mg or more, more effectively in a multi-layer ceramic capacitor 10 with the weight of 100 mg or more, and still more effectively in a multi-layer ceramic capacitor 10 with the weight of 300 mg or more.

In the configuration shown in FIG. 7, a position of the outer surface of the protective unit 20, which has the shortest distance D from the end portion E of the outermost layer in the first and second internal electrodes 12 and 13, is located at the rounded end portion of the side margin 17 in the Z-axis direction. However, the configuration of the protective unit 20 is not limited to that shown in FIG. 7 and may be those shown in FIGS. 8A to 8C, for example.

Figure 8A:
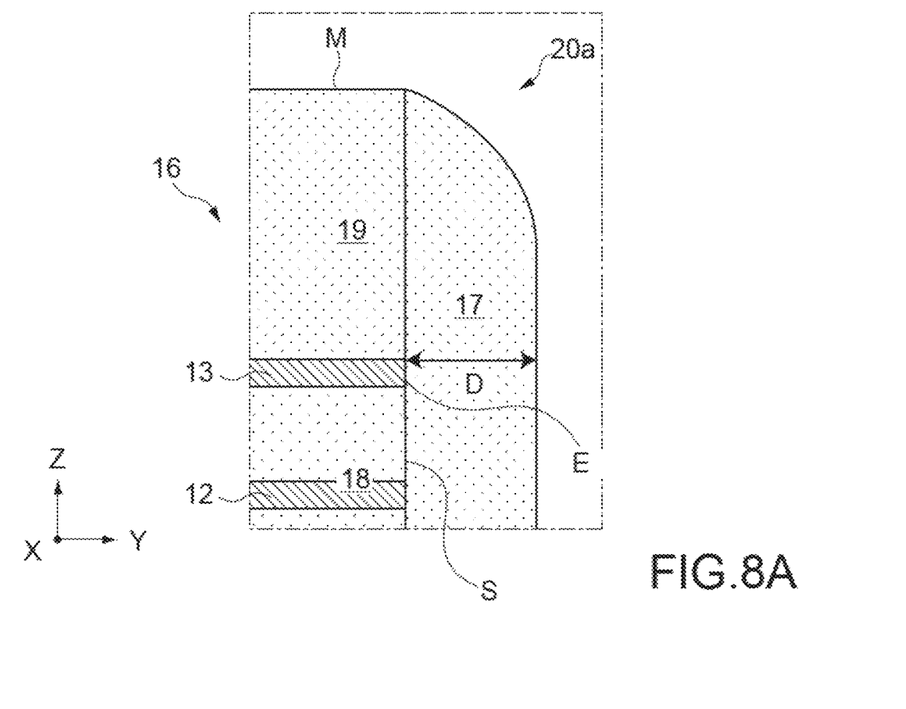
FIG. 8A is a partial cross-sectional view showing a modified example of the multi-layer ceramic capacitor.

Compared to the configuration shown in FIG. 7, in the configuration shown in FIG. 8A, the first internal electrodes 12 and the second internal electrodes 13 are positioned inward in the Z-axis direction, and the thickness of the cover 19 in the Z-axis direction is large. In this configuration, a position of the outer surface of the protective unit 20, which has the shortest distance D from the end portion E of the outermost layer in the first and second internal electrodes 12 and 13, is located at a flat portion of the outer surface of the protective unit 20, which is located inward in the Z-axis direction relative to the rounded end portion of the side margin 17.

Figure 8B:
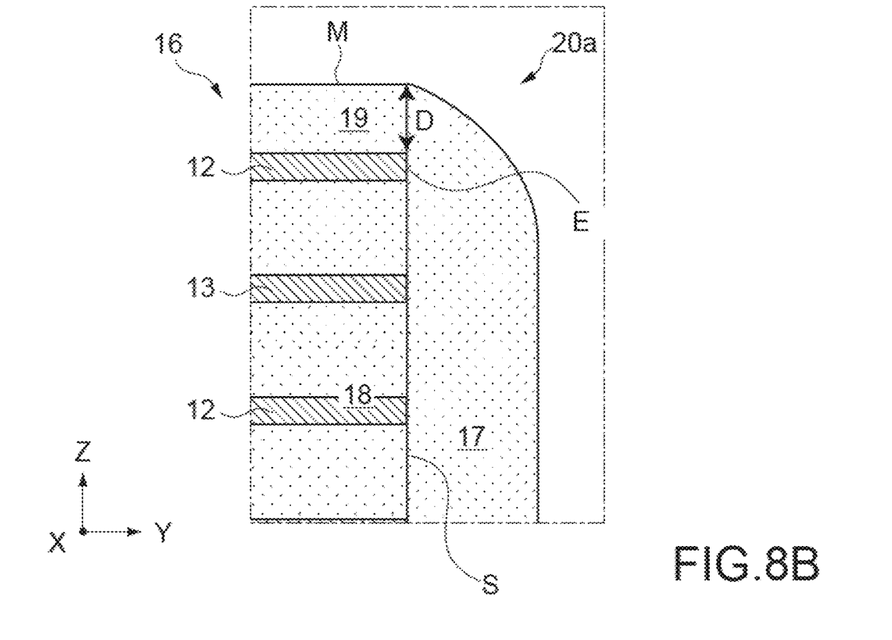
FIG. 8B is a partial cross-sectional view showing a modified example of the multi-layer ceramic capacitor.

Compared to the configuration shown in FIG. 7, in the configuration shown in FIG. 8B, the first internal electrodes 12 and the second internal electrodes 13 are disposed outward in the Z-axis direction, and the thickness of the cover 19 in the Z-axis direction is reduced. In this configuration, a position of the outer surface of the protective unit 20, which has the shortest distance D from the end portion E of the outermost layer in the first and second internal electrodes 12 and 13, is located at a connection portion of the cover 19 and the side margin 17.

Figure 8C:
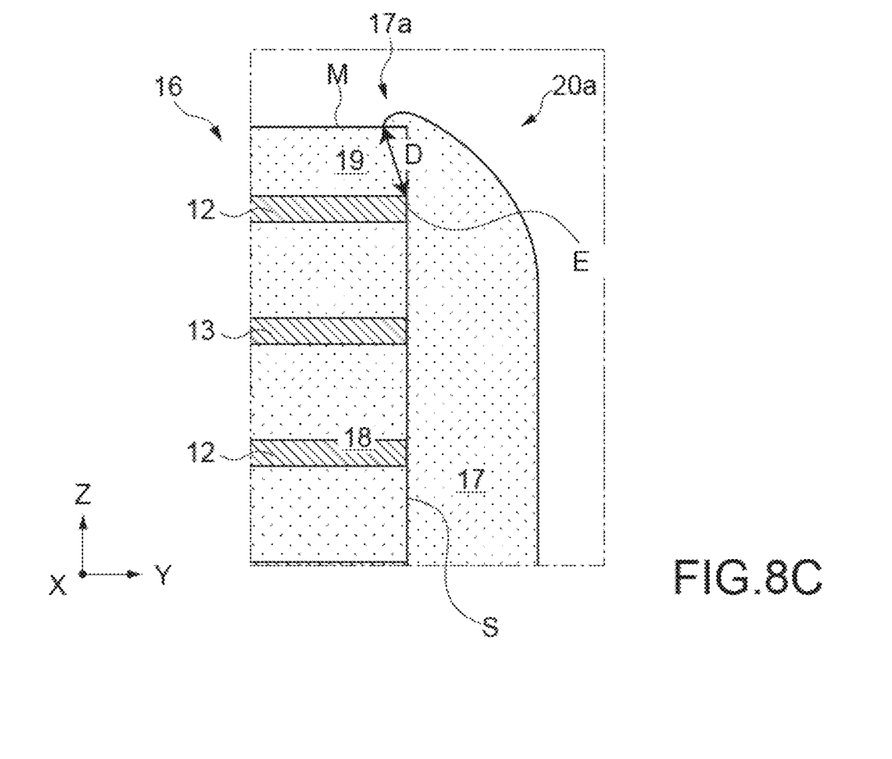
FIG. 8C is a partial cross-sectional view showing a modified example of the multi-layer ceramic capacitor.

In the configuration shown in FIG. 8C, an extended portion 17a is provided to the side margin 17 shown in FIG. 8B. The extended portion 17a slightly extends to the main surface M from the surface S of the multi-layer unit 16. In this configuration, a position of the outer surface of the protective unit 20, which has the shortest distance D from the end portion E of the outermost layer in the first and second internal electrodes 12 and 13, is located at a boundary portion between the cover 19 and the extended portion 17a of the side margin 17.

In any of the configurations shown in FIGS. 8A to 8C, the shortest distance D is configured to exceed 10 µm, so that a crack generated in the ridge 20a of the protective unit 20 is less likely to reach the end portion E of the outermost layer in the first and second internal electrodes 12 and 13 as in the configuration shown in FIG. 7. This provides high moisture resistance to the multi-layer ceramic capacitor 10.

4. EXAMPLES AND COMPARATIVE EXAMPLES

Examples and Comparative examples of the embodiment will be described. Examples and Comparative examples to be described below are merely examples for confirming the effects of the embodiment described above. Accordingly, the configuration of the embodiment described above is not limited to the configurations of Examples. In Examples and Comparative examples, samples of the multi-layer ceramic capacitors mainly containing $BaTiO_3$ were produced by the production method described above.

In each of Examples 1 to 8 and Comparative examples 1 to 11, 1,000 samples were produced. The samples are different in size and weight in the range from 8 mg to 339 mg between those examples. Further, the samples of Examples 1 to 8 have a configuration in which the shortest distance D exceeds 10 µm, and the samples of Comparative examples 1 to 11 have a configuration in which the shortest distance D is 10 µm or less.

Table 1 shows the size, the weight, and the shortest distance D of the samples according to Examples 1 to 8 and Comparative examples 1 to 11. In the size of the samples according to Examples 1 to 8 and Comparative examples 1 to 11 shown in Table 1, a "length" represents a dimension in the X-axis direction, a "width" represents a dimension in the Y-axis direction, and a "thickness" represents a dimension in the Z-axis direction.

TABLE 1

|  | Size(mm) | | | Weight (mg) | Shortest distance D (µm) |
|---|---|---|---|---|---|
|  | Length | Width | Thickness | | |
| Example1 | 1.6 | 0.8 | 0.8 | 8 | 11 |
| Example2 | 1.6 | 0.8 | 0.8 | 8 | 12 |
| Example3 | 2.0 | 1.25 | 1.25 | 26 | 11 |
| Example4 | 2.0 | 1.25 | 1.25 | 26 | 12 |
| Example5 | 3.2 | 1.6 | 1.6 | 73 | 11 |
| Example6 | 4.5 | 3.2 | 2.5 | 253 | 11 |
| Example7 | 4.5 | 3.2 | 3.2 | 339 | 11 |
| Example8 | 4.5 | 3.2 | 3.2 | 339 | 12 |
| Comparative example1 | 1.6 | 0.8 | 0.8 | 8 | 8 |
| Comparative example2 | 1.6 | 0.8 | 0.8 | 8 | 9 |
| Comparative example3 | 1.6 | 0.8 | 0.8 | 8 | 10 |
| Comparative example4 | 2.0 | 1.25 | 1.25 | 26 | 9 |
| Comparative example5 | 2.0 | 1.25 | 1.25 | 26 | 10 |
| Comparative example6 | 3.2 | 1.6 | 1.6 | 73 | 9 |
| Comparative example7 | 3.2 | 1.6 | 1.6 | 73 | 10 |
| Comparative example8 | 4.5 | 3.2 | 2.5 | 253 | 9 |
| Comparative example9 | 4.5 | 3.2 | 2.5 | 253 | 10 |
| Comparative example10 | 4.5 | 3.2 | 3.2 | 339 | 9 |
| Comparative example11 | 4.5 | 3.2 | 3.2 | 339 | 10 |

The samples according to Examples 1 to 8 and Comparative examples 1 to 11 were caused to drop from a predetermined height and collide with similar samples separately prepared. Subsequently, a moisture resistance load test was performed, in which the samples were held for 500 hours at a temperature of 40° C. and a humidity of 95%. For each of the samples subjected to the moisture resistance load test, an electric resistance was measured, and samples whose electric resistance has a value smaller than 1 MΩ were determined as defective.

Tables 2 and 3 each show evaluation results of the moisture resistance load test. Tables 2 and 3 each show collision energy to be applied to the samples when the samples drop, and a failure rate that is a rate of the samples determined as defective in the moisture resistance load test. The collision energy (J) can be calculated as "(weight (kg))*(drop height (m))*(acceleration of gravity (m/s$^2$)) of each sample".

Table 2 shows the failure rate in the moisture resistance load test, in which the drop height is 3 cm and which is performed for the samples according to Examples 1 to 8 and Comparative examples 1 to 11. As shown in Table 2, no defective samples occurred in the moisture resistance load test for all of Examples 1 to 8. Meanwhile, defective samples occurred in the moisture resistance load test for all of Comparative examples 1 to 11.

TABLE 2

| | Collision energy (J) | Failure rate in moisture resistance load test |
|---|---|---|
| Example1 | 2.35E−06 | 0.0% |
| Example2 | 2.35E−06 | 0.0% |
| Example3 | 7.64E−06 | 0.0% |
| Example4 | 7.64E−06 | 0.0% |
| Example5 | 2.15E−05 | 0.0% |
| Example6 | 7.44E−05 | 0.0% |
| Example7 | 9.97E−05 | 0.0% |
| Example8 | 9.97E−05 | 0.0% |
| Comparative example1 | 2.35E−06 | 0.2% |
| Comparative example2 | 2.35E−06 | 0.2% |
| Comparative example3 | 2.35E−06 | 0.1% |
| Comparative example4 | 7.64E−06 | 0.1% |
| Comparative example5 | 7.64E−06 | 0.2% |
| Comparative example6 | 2.15E−05 | 0.3% |
| Comparative example7 | 2.15E−05 | 0.1% |
| Comparative example8 | 7.44E−05 | 0.2% |
| Comparative example9 | 7.44E−05 | 0.1% |
| Comparative example10 | 9.97E−05 | 0.3% |
| Comparative example11 | 9.97E−05 | 0.3% |

Table 3 shows the failure rate in the moisture resistance load test, in which the drop height is 5 cm and which is performed for the samples according to Examples 1 to 8 and Comparative examples 3, 4, 7, 10, and 11. As shown in Table 3, no defective samples occurred in the moisture resistance load test for all of Examples 1 to 8. Meanwhile, defective samples occurred in the moisture resistance load test for all of Comparative examples 3, 4, 7, 10, and 11.

TABLE 3

| | Collision energy (J) | Failure rate in moisture resistance load test |
|---|---|---|
| Example1 | 3.92E−06 | 0.0% |
| Example2 | 3.92E−06 | 0.0% |
| Example3 | 1.27E−05 | 0.0% |
| Example4 | 1.27E−05 | 0.0% |
| Example5 | 3.58E−05 | 0.0% |
| Example6 | 1.24E−04 | 0.0% |
| Example7 | 1.66E−04 | 0.0% |
| Example8 | 1.66E−04 | 0.0% |

TABLE 3-continued

| | Collision energy (J) | Failure rate in moisture resistance load test |
|---|---|---|
| Comparative example3 | 3.92E−06 | 0.2% |
| Comparative example4 | 1.27E−05 | 0.2% |
| Comparative example7 | 3.58E−05 | 0.2% |
| Comparative example10 | 1.66E−04 | 0.4% |
| Comparative example11 | 1.66E−04 | 0.4% |

From those results, it is thought that cracks that may reach the first and second internal electrodes 12 and 13 were not generated in the protective units 20 of all the samples according to Examples 1 to 8. Meanwhile, it is thought that cracks that may reach the first and second internal electrodes 12 and 13 were generated in the protective units 20 of all the samples, which have been determined as defective in the moisture resistance load test for Comparative examples 1 to 11.

Figure 9A:
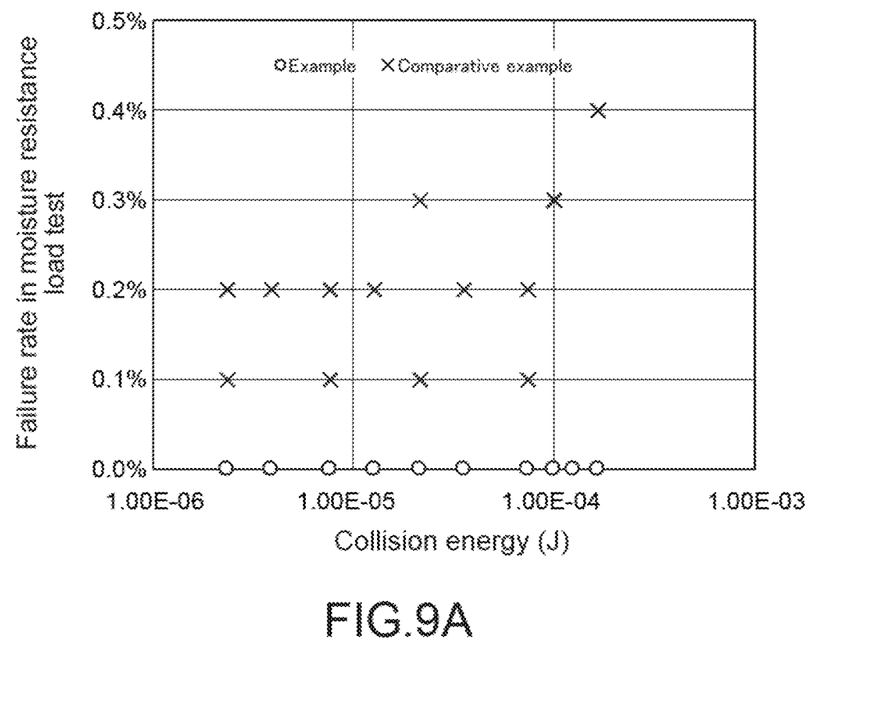
FIG. 9A is a graph showing evaluation results of Examples and Comparative examples.

FIG. 9A is a graph showing all the evaluation results of the moisture resistance load test. In FIG. 9A, the horizontal axis represents the collision energy and the vertical axis represents the failure rate in the moisture resistance load test. It is found that, as the collision energy becomes larger, the samples according to Comparative examples tend to have an increasing failure rate in the moisture resistance load test and cracks that may reach the internal electrodes are likely to be generated in the protective units.

Figure 9B:
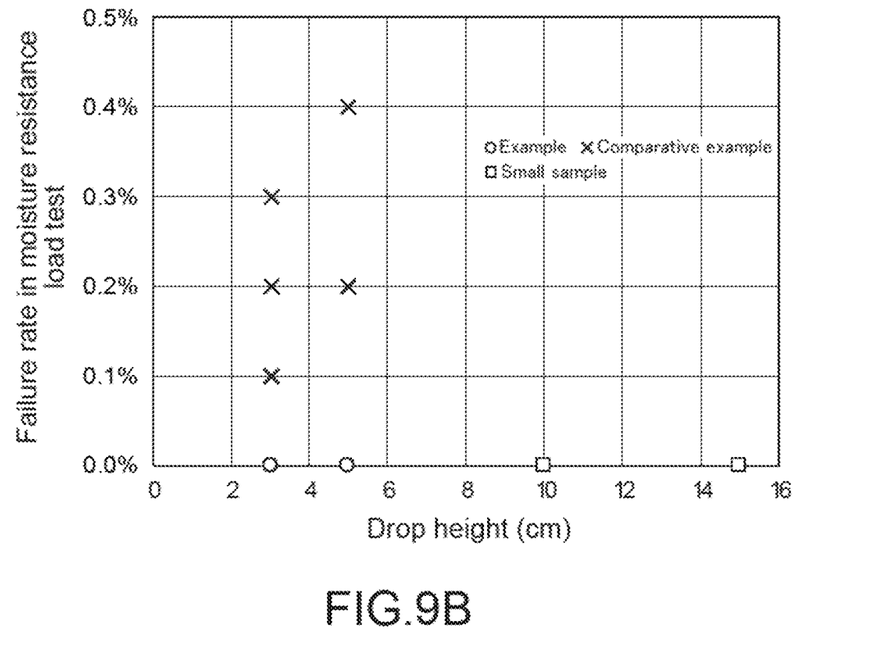
FIG. 9B is a graph showing evaluation results of Examples and Comparative examples.

FIG. 9B is a graph in which the horizontal axis of FIG. 9A is changed to the drop height. The drop height assumed in normal manufacturing or mounting is approximately 3 cm, or approximately 5 cm at a maximum. Accordingly, it is found that the samples according to Examples 1 to 8 can effectively suppress reduction in moisture resistance, which is caused by cracks generated when the samples drop in normal manufacturing or mounting.

Further, FIG. 9B also shows evaluation results in a moisture resistance load test for small samples of the multi-layer ceramic capacitor, the moisture resistance load test being similar to that performed for Examples and Comparative examples. Specifically, the size of the small sample was set to a length of 1.0 mm, a width of 0.5 mm, and a thickness of 0.5 mm. Further, the small sample was set to have a weight of 2 mg and a shortest distance D of 10 μm.

In any of the small samples, defective samples were not generated in the moisture resistance load test even when the drop height was set to 10 cm and further 15 cm, which are much higher than that assumed in normal manufacturing or mounting. Accordingly, it is considered that the small samples do not have cracks that may reach the internal electrodes in the protective units, irrespective of the shortest distance D of 10 μm or less.

In this regard, in the small samples of the multi-layer ceramic capacitor whose weight is less than 8 mg, even if the drop height is large, the collision energy does not increase, and thus it is considered that the cracks are not likely to be generated. Accordingly, in the small samples whose weight is less than 8 mg, reduction in moisture resistance due to the generation of cracks is less likely to occur if the shortest distance D is not configured to exceed 10 μm.

The invention claimed is:

1. A multi-layer ceramic capacitor having a weight of 8 mg or more, comprising:
 a capacitance forming unit including
  internal electrodes that are laminated in a first direction and include end portions and an outermost layer in the first direction, positions of the end portions in a second direction orthogonal to the first direction being aligned with one another within a range of 0.5 µm in the second direction; and a protective unit that covers the capacitance forming unit in the first direction and the second direction and includes an outer surface, a shortest distance between the outer surface and the end portion of the outermost layer in the internal electrodes exceeding 10 µm, the protective unit being formed of dielectric ceramics, wherein the protective unit includes two covers sandwiching the capacitance forming unit from the first direction and two side margins sandwiching the capacitance forming unit and the two covers from the second direction, wherein the two covers respectively including a main surface facing in the first direction and two side surfaces facing in the second direction, wherein the two side margins respectively including an extended portion extending to the main surface from one of the side surface and covering an end in the second direction of the main surface, and wherein a position of the outer surface, which has the shortest distance from the end portion of the outermost layer in the internal electrodes, is located at a boundary portion between one of the two cover and the extended portion.

2. The multi-layer ceramic capacitor according to claim 1, wherein
the outer surface of the protective unit has an exposure dimension of 1 mm or more in a third direction orthogonal to the first direction and the second direction.

3. The multi-layer ceramic capacitor according to claim 2, wherein
the outer surface of the protective unit has an exposure dimension of 2.5 mm or more in the third direction.

4. The multi-layer ceramic capacitor according to claim 1, wherein
the number of lamination of the internal electrodes is 500 layers or more.

5. The multi-layer ceramic capacitor according to claim 1, wherein
the maximum thickness of the protective unit in the second direction is 30 µm or more.

6. The multi-layer ceramic capacitor according to claim 5, wherein
the maximum thickness of the protective unit in the second direction is 50 µm or less.

7. The multi-layer ceramic capacitor according to claim 1, wherein
the multi-layer ceramic capacitor has a weight of 100 mg or more.

8. The multi-layer ceramic capacitor according to claim 7, wherein
the multi-layer ceramic capacitor has a weight of 300 mg or more.

9. The multi-layer ceramic capacitor according to claim 1, wherein the multi-layer ceramic capacitor has a weight of 25 mg or more and 350 mg or less.

* * * * *